United States Patent
Shekunov et al.

(10) Patent No.: US 7,455,797 B2
(45) Date of Patent: *Nov. 25, 2008

(54) METHOD AND APPARATUS FOR PRODUCING PARTICLES USING SUPERCRITICAL FLUID

(75) Inventors: Boris Y. Shekunov, Aurora, OH (US); Pratibhash Chattopadhyay, North Royalton, OH (US); Jeffrey S. Seitzinger, Broadview Heights, OH (US); Robert Huff, North Royalton, OH (US)

(73) Assignee: Ferro Corporation, Cleveland, OH (US)

( * ) Notice: Subject to any disclaimer, the term of this patent is extended or adjusted under 35 U.S.C. 154(b) by 338 days.

This patent is subject to a terminal disclaimer.

(21) Appl. No.: 10/789,422

(22) Filed: Feb. 27, 2004

(65) Prior Publication Data

US 2004/0200774 A1    Oct. 14, 2004

Related U.S. Application Data

(60) Provisional application No. 60/451,073, filed on Feb. 28, 2003.

(51) Int. Cl.
*B29B 9/00* (2006.01)

(52) U.S. Cl. .................. 264/5; 210/639; 210/737; 264/11; 264/12; 424/489

(58) Field of Classification Search ................ 210/259, 210/511, 634, 639, 708, 806, 737; 422/256, 422/257; 426/655; 424/489–502; 516/53, 516/54; 264/5, 11, 12
See application file for complete search history.

(56) References Cited

U.S. PATENT DOCUMENTS

| | | | | |
|---|---|---|---|---|
| 5,639,441 A | * | 6/1997 | Sievers et al. | 424/9.3 |
| 6,113,795 A | * | 9/2000 | Subramaniam et al. | 210/651 |
| 6,184,270 B1 | * | 2/2001 | Beckman et al. | 523/309 |
| 6,372,260 B1 | * | 4/2002 | Andersson et al. | 424/501 |

(Continued)

OTHER PUBLICATIONS

Publication: "Introduction to Supercritical Fluids", Critical Processes Ltd. "www.criticalprocesses.com/SCFmore.html", adapted from the introduction to Fundamentals of Supercritical Fluids by Tony Clifford, published by the Oxford University Press in 1998.*

(Continued)

*Primary Examiner*—Joseph W Drodge
(74) *Attorney, Agent, or Firm*—Rankin, Hill & Clark LLP

(57) ABSTRACT

The present invention provides a method of producing particles via a supercritical fluid processing technique, an apparatus for carrying out the method and the particles produced thereby. The method includes: (1) providing: a supercritical fluid; a first solvent that is soluble in the supercritical fluid; a second solvent that is substantially insoluble in the supercritical fluid and is at least partially soluble in or miscible with the first solvent; and a solute that is soluble in the first solvent and is substantially insoluble in the second solvent and the supercritical fluid; (2) contacting the first solvent, the second solvent and the solute together to form a solution; and (3) contacting the solution with the supercritical fluid to extract the first solvent from the solution and precipitate the solute in the form of particles that are suspended in the second solvent.

26 Claims, 3 Drawing Sheets

U.S. PATENT DOCUMENTS 6,998,051 B2 * 2/2006 Chattopadhyay et al. .... 210/634
7,083,748 B2 * 8/2006 Chattopadhyay et al. ...... 264/14

OTHER PUBLICATIONS above publication has es 1-5, downloaded from the Internet on Jul. 5, 2007.*

Publication: "Supercritical Fluid—Wikipedia, the free encyclopedia", "en.wikipedia.org/wiki/Supercritical_fluid", pp. 1-3, page last modified Jun. 26, 2007, downloaded from the Internet on Jul. 5, 2007.*

U.S. Appl. No. 60/445,944, filed on Feb. 7, 2003.*

* cited by examiner

METHOD AND APPARATUS FOR PRODUCING PARTICLES USING SUPERCRITICAL FLUID

BACKGROUND OF THE INVENTION

1. Field of Invention

The present invention provides a method of producing particles using supercritical fluid, an apparatus for carrying out the method and particles formed thereby.

2. Description of Related Art

Several processing techniques utilize the enhanced mass-transfer properties and benign nature of supercritical or near-critical fluid or compressed gas (hereinafter collectively referred to and defined as "supercritical fluid" or "SCF") to produce composite or single-material particles. One such method or technique, which is sometimes referred to as the conventional Supercritical Anti-Solvent (SAS) or Gas Anti-solvent (GAS) processing technique, involves the addition of a supercritical fluid to a solution containing a solute dissolved in an organic solvent. The supercritical fluid acts as an anti-solvent in that it precipitates the solute in the form of particles that are suspended in the supercritical fluid.

There are several disadvantages of conventional SAS method including particle agglomeration ("bridging") caused by particle contacts during nucleation, aggregation due to plasticization of some materials (for example polymers) in SCF and also insufficient control of particle size distribution. These disadvantages can be associated with the fundamental mechanism of precipitation in SCF. It is therefore desirable to provide an additional control over particle formation by introducing an additional solvent (the "second solvent") that influences the precipitation process. For example, precipitation of the solute in the presence of the second solvent can influence the particle growth characteristics and mass transfer rates therefore causing alteration in the particle precipitation kinetics. This in turn can lead to precipitation of particles with differing physical properties such as crystallinity, crystal shape, uniformity and size.

In addition, the conventional SAS method is typically carried out as a batch process. It is very difficult, if possible at all, to scale up a conventional SAS batch method as a continuous operation on the industrial scale. Therefore addition of a solvent can allow the product to be transported out the pressurized precipitation vessel, thus allowing for a continuous sample collection.

BRIEF SUMMARY OF THE INVENTION

The present invention provides a method of producing particles using a supercritical fluid. In accordance with the method, a first solvent that is soluble in the supercritical fluid, a second solvent that is substantially insoluble in the supercritical fluid and is at least partially soluble in or miscible with the first solvent, and a solute that is soluble in the first solvent and is substantially insoluble in the second solvent and in the supercritical fluid are contacted together to form a solution. The solution is contacted with the supercritical fluid, which extracts the first solvent from the solution and precipitates the solute in the form of particles that become suspended in the second solvent.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Figure 1:
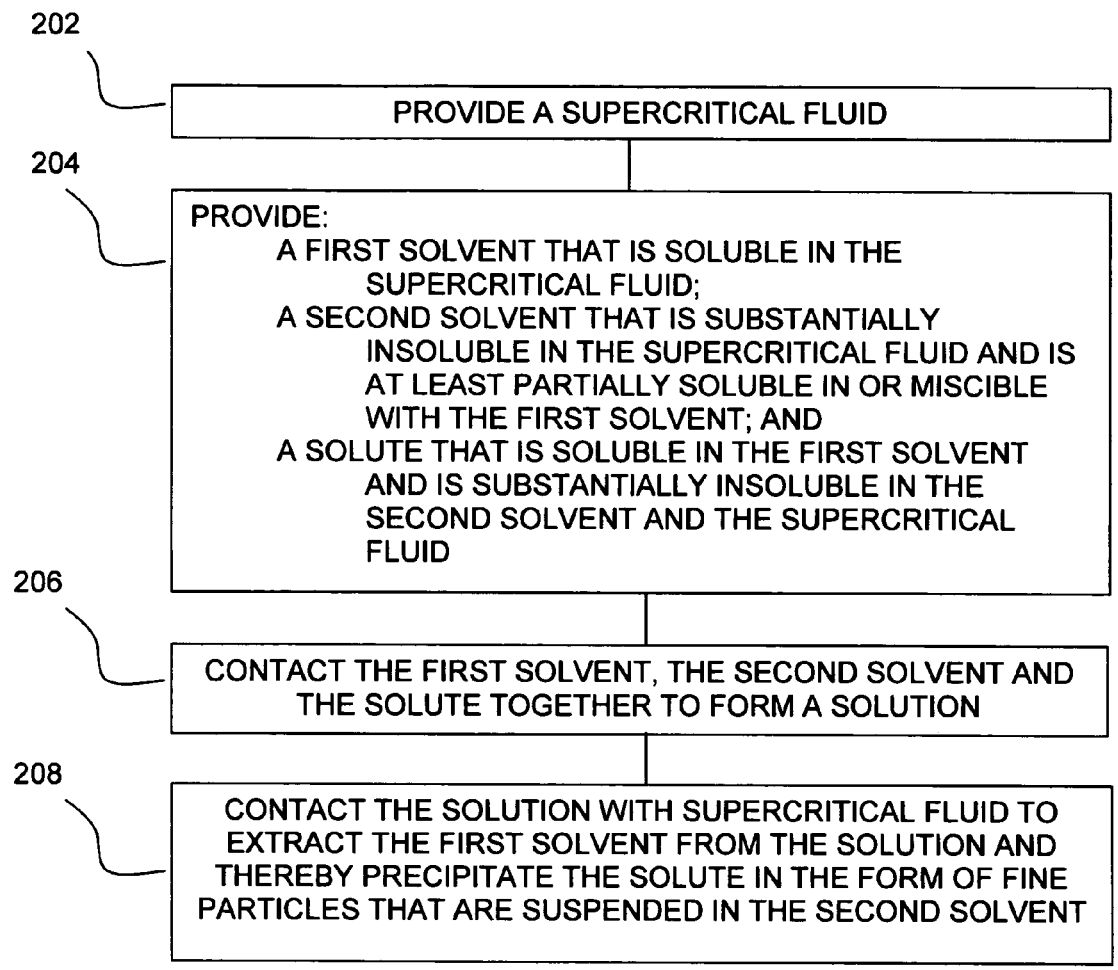
FIG. 1 is a block diagram showing the steps of the method of the invention.

The steps of the method of the invention are shown in FIG. 1. A supercritical fluid is provided (Step 202). Throughout the instant specification and in the appended claims, the term "supercritical fluid" means a supercritical or near-critical fluid or compressed gas. The presently most preferred supercritical fluid for use in the invention is supercritical carbon dioxide. Suitable alternatives include, for example, nitrous oxide, dimethylether, straight chain or branched C1-C6-alkanes, alkenes, alcohols, and combinations thereof. Preferable alkanes and alcohols include ethane, ethanol, propane, propanol, butane, butanol, isopropane, isopropanol, and the like.

A first solvent that is soluble in the supercritical fluid, a second solvent that is substantially insoluble in the supercritical fluid and is at least partially soluble in or miscible with the first solvent, and a solute that is soluble in the first solvent and is substantially insoluble in the second solvent and the supercritical fluid are also provided (Step 204).

The first solvent is preferably an organic solvent. Suitable organic solvents include dimethyl formamide, dimethyl sulfoxide, alcohols, acetone, ethyl acetate and chloroform. The selection of the first solvent must be made in view of its ability to dissolve or solvate the solute, its solubility in the second solvent and, lastly, its solubility in the supercritical fluid. The second solvent is preferably a polar solvent such as water.

The solute can be any material that is soluble in the first solvent, substantially insoluble in the second solvent and insoluble in the supercritical fluid. Because the method of the invention can be used to form highly uniform small particles that are substantially free of organic solvents, preferred solutes are water-insoluble biologically active substances. It will be appreciated that there are a large number of water-insoluble biologically active substances that can be processed in accordance with the method of the invention.

The first solvent, the second solvent and the solute are contacted together to form a solution (Step 206). As used in the instant specification and in the appended claims, the term "solution" refers to any system in which the solute is dissolved in the first solvent or the first solvent containing the solute is dissolved in the second solvent.

Different additives, for example, surface active compounds or surfactants, can be used in the first or the second solvent in order to effect particle growth kinetics. If the solute is a biologically active substance, the surfactant(s) used should be biodegradable and pharmaceutically accepted surfactants. The surfactant(s) can be non-ionic, anionic or cationic surfactants. Some of the preferred surfactants include, for example, poly(vinyl pyrrolidone), polyglycerol, polyricinoleate, poly(vinyl alcohol), and block copolymers.

The solution is contacted with the supercritical fluid to extract the first solvent from the solution and thereby precipitate the solute in the form of fine particles that are suspended in the second solvent (Step 208). In most cases the particles are precipitated in the crystalline form. Other physical characteristics of the particles namely size, crystalline shape and agglomeration can be altered by varying the nature of the solvents used or by the addition of suitable surfactants in the solvents used.

It will be appreciated that if composite particles are desired, the solution can further comprise one or more solutes prior to being contacted with the supercritical fluid. Preferred additional solutes include excipients such as polymers, waxes and/or lipids, which can be used as carriers or supports for biologically active substances. Particularly preferred additional solutes include, for example, polysaccharides, polyesters, polyethers, polyanhydrides, polyglycolides, polylactic acid, and polyglycolic acid and their copolymers and polycaprolactone.

The particles produced in accordance with the method of the invention generally exhibit a substantially uniform shape, homogeneity and size. The particles produced according to the invention tend to exhibit a narrow size distribution and can be produced within the range of from about 10 nm to about 1 mm. Preferred particle sizes are within the range of from about 1 µm to about 100 µm.

Figure 2:
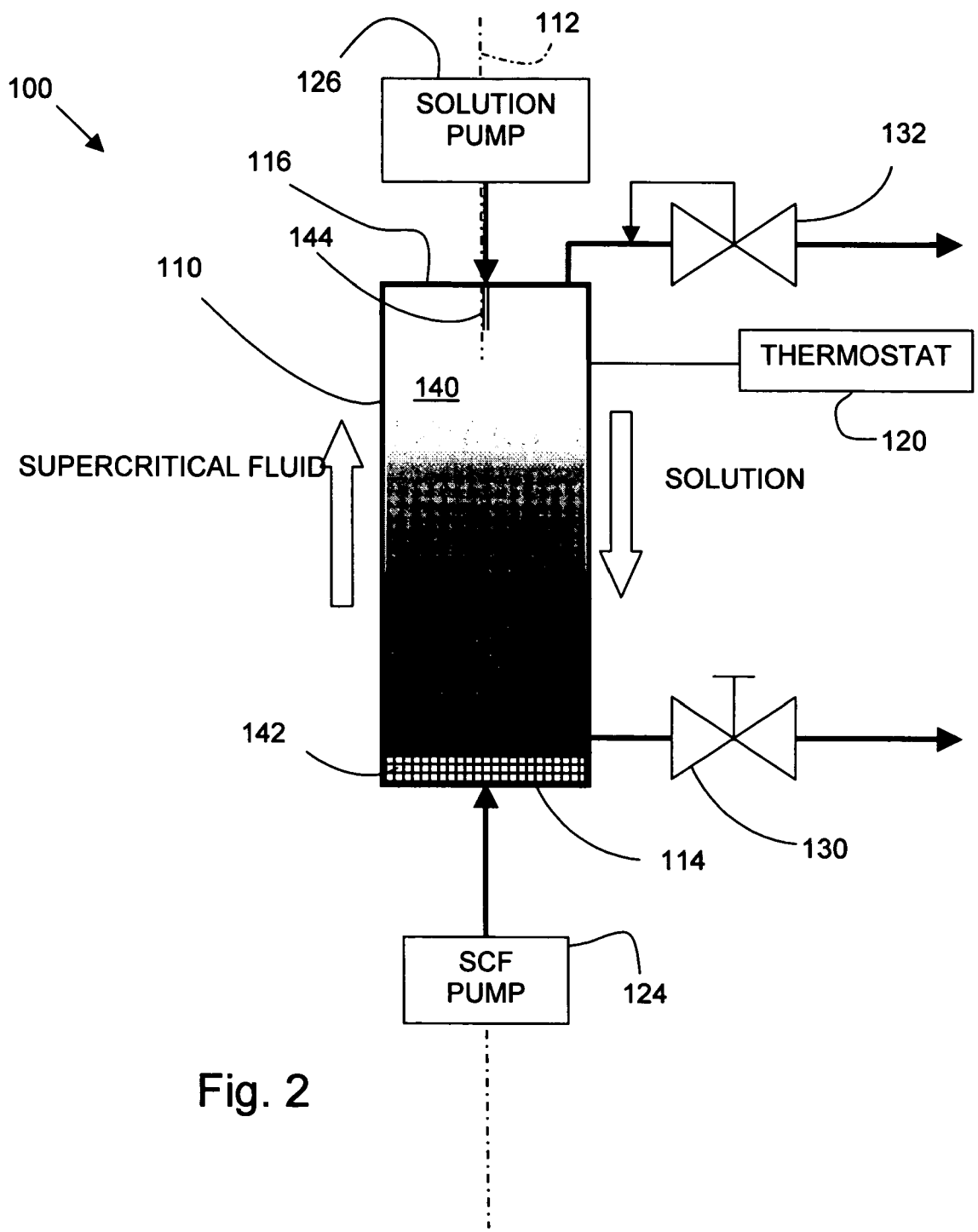
FIG. 2 is a schematic representation an apparatus for carrying out the method of the invention.

An example of an apparatus 100 for implementing the method of the present invention is schematically shown in FIG. 2. The apparatus 100 includes a reactor or extraction vessel 110. The extraction vessel 110 can be of any shape, but is preferably tubular in shape and having a longitudinal axis 112. The extraction vessel 110 preferably has first and second ends 114, 116 that are spaced axially apart from each other. Preferably, the longitudinal axis 112 of the extraction vessel 110 is oriented vertically such that the first end 114 is below the second end 116. That is, the second end 116 is UP and the first end 114 is DOWN when moving along the longitudinal axis 112.

A thermostat 120 controls heating elements (not shown) that are located proximate to the extraction vessel 110. A supercritical fluid pump 124 communicates with the first end 114 of the extraction vessel 110, and a solution pump 126 communicates with the second end 116 of the extraction vessel 110. A release valve 130 and a backpressure regulator 132 also communicate with the extraction vessel 110.

The supercritical fluid pump 124 is preferably a P-200 high-pressure reciprocating pump commercially available from Thar Technologies, Inc. (Pittsburgh, Pa.). Suitable alternative pumps include diaphragm pumps and air-actuated pumps that provide a continuous flow of supercritical fluid. Preferably, the supercritical fluid pump 124 can be supplemented with a surge tank and metering valve (not shown) so as produce a pulse-free flow of supercritical fluid.

The solution pump 126 is preferably a high-pressure liquid chromatography (HPLC) reciprocating pump such as the model PU-2080, which is commercially available from Jasco Inc. (Easton, Md.). Suitable alternative pumps include syringe type pumps, such as the 1000D or 260D pumps, which are commercially available from Isco Inc. (Lincoln, Nebr.).

The release valve 130 is preferably a standard commercially available valve and is interchangeable with other like valves that are known to those of ordinary skill in the art. The backpressure regulator 132 is preferably a 26-1700 type regulator, which is commercially available from Tescom, USA (Elk River, Minn.).

The extraction vessel 110 has an inner surface that defines an extraction chamber 140. Disposed within the extraction chamber 140 are a frit 142 (preferably stainless steel and having a pore size of less than about 0.5 micrometer (µm)) and a nozzle 144. The frit 142 overlays the inner surface of the first end 114 of the extractor 110. The supercritical fluid pump 124 is in fluid communication with the frit 142 and supplies supercritical fluid through the frit 142 into the extraction chamber 140. The frit 142 is micro-porous and the supercritical fluid flows through the frit 142 and breaks into a plurality of dispersed flow streams of supercritical fluid.

The nozzle 144 is preferably a capillary-type nozzle and extends from the inner surface of the extractor 110 at the second end 116 into the extraction chamber 140. The solution pump 126 is in fluid communication with the nozzle 144 and supplies the solution through the nozzle 144 into the extraction chamber 140.

Preferably, the first solvent and the second solvent are thoroughly mixed prior to being supplied to the extraction chamber 140 and are co-introduced simultaneously through a single nozzle 144 or nozzle assembly. However, alternative nozzles can be used such as twin or multi-component dispersion nozzles or other tubular nozzles in which the first, the second solvents and supercritical fluids can be mixed together in the nozzle. Alternatively, the solution can be loaded into the extraction vessel and then supercritical $CO_2$ can be bubbled through the solution using a supercritical fluid pump.

It will be appreciated that the manner in which the solution and the supercritical fluid are contacted together is not per se critical, and a variety of methods of mixing can be employed including, but are not limited to, co-current and contra-current injection methods, in which the solution is co-introduced with the supercritical fluid in order to facilitate the dispersion process, and static and moving methods employing mixing devices such as baffles, rotors, turbines, shear-mixers, ultrasonic and other devices and mechanisms used to enhance mixing of the components being introduced.

The supercritical fluid and the solution comprising of the solute, the first solvent and the second solvent contact each other in the extraction chamber 140. Subsequently, the first solvent is rapidly extracted from the solution by the supercritical fluid and the solute is precipitated from the solution and is suspended in the second solvent.

If desired, a controller (not shown) can be used to communicate between and control the various components of the apparatus 100. The controller can, for example, adjust the flow rates of the supercritical fluid pump 124, the solution pump 126, the backpressure regulator 132, and the release valve 130 and can adjust the temperature and pressure in the extractor by controlling the thermostat 120.

The extraction vessel 110, when used to carry out the first embodiment of the method of the invention, is preferably maintained at constant operating temperature and pressure by the thermostat 120 and controllers. The supercritical fluid pump 124 preferably charges the extraction chamber 140 with supercritical fluid and thereby brings the extraction chamber 140 to a desired predetermined pressure and temperature. The solution pump 126 supplies solution and the supercritical fluid pump 124 supplies supercritical fluid to the extraction vessel 110, preferably as simultaneous and continuous flows. The ratio of the flow rates of both the solution and the supercritical fluid are maintained constant throughout the process.

Specifically, the supercritical fluid is dispersed upward into the extraction chamber 140 through the frit 142 at the first end 114 of the extraction vessel 110 as indicated by the directional arrow labeled SUPERCRITICAL FLUID in FIG. 2. Simultaneously, the solution is supplied downward into the extraction chamber 140 through the nozzle 144 at the upper second end 116 of the extraction vessel 110 as indicated by the directional arrow labeled SOLUTION in FIG. 2.

The supercritical fluid intermingles with and contacts the solution during the countercurrent flow. The supercritical fluid extracts the first solvent from the solution thereby causing precipitation of the solute. The solute particles thus obtained are suspended in second solvent and continue to flow downwards due to gravity and collect at the bottom of the extraction chamber.

The supercritical fluid carries the dissolved first solvent upward to the backpressure regulator 132. The supercritical fluid and solvent exit the extraction chamber 140 via the backpressure regulator 132. Optionally, the supercritical fluid and solvent can be recycled for reuse.

Once the precipitation process is complete, particle collection can be carried out in either a continuous or batch mode. In the continuous mode, particle collection is achieved by allowing the suspension formed to flow into a collection vessel attached at the bottom of the extraction chamber. The suspension flows into the extraction chamber with the aid of gravity. Once full the collection vessel is first isolated form the extraction chamber using a high-pressure valve and drained using another high-pressure valve in order to yield the particulate suspension.

In the batch mode for particle collection, the solution flow is first halted. Excess supercritical fluid is then allowed to flow through the extraction chamber for removal of the residual first solvent dissolved in the supercritical fluid in the extraction chamber. After complete removal of the first solvent, the extractor is depressurized and the solute particle suspension is collected.

It will be appreciated that, if required, suitable filtration devices such as high pressure filters or cyclone separators can be attached directly to the exhaust of the extraction chamber or the collection vessel in the continuous mode, or use separately in the batch mode, in order to separate the particles form the second solvent. In some cases an additional processing step can be implemented such as spray drying or freeze-drying, by which any remaining solvents can be removed from the suspension.

In the second embodiment of the process, the solution comprising of the first solvent, the second solvent and the solute is loaded directly into the extraction chamber. Supercritical $CO_2$ is the bubbled through the solution in the extraction chamber to remove the first solvent there by precipitating the solute in the form of a suspension in the second solvent. Once the precipitation process is complete the obtained particulate suspension is removed from the extraction chamber in the batch mode as described in the earlier embodiment.

In alternative embodiments, the flow of supercritical fluid relative to the solution is co-current, rather than counter-current. In another alternative embodiment, multiple solutes and/or multiple solvents are used, and the morphology of the particles is controlled by, for example, the type of materials used, the relative concentrations of the solutes in the solvents, and the choice and number of solvents selected to carrier or dissolve the multiple solutes.

The following example is intended only to illustrate the invention and should not be construed as imposing limitations upon the claims. Unless specified otherwise, all ingredients are commercially available from such common chemical suppliers as Sigma Aldrich, Inc. (St. Louis, Mo.) and/or Fisher Scientific International, Inc. (Hanover Park, Ill.).

EXAMPLE 3 grams of griseofulvin were dissolved in 20 grams of dimethyl formamide and 80 grams of distilled water to form a solution. The solution was mixed until it was homogenous. A 5 ml aliquot of the solution was injected into an extraction vessel configured as shown in FIG. 2. Supercritical carbon dioxide (150 bars pressure, 50° C.) was flowed into the extraction vessel at a rate of 0.5 ml/min. A stream of $CO_2$ laden with extracted dimethyl formamide was removed from the vessel at the same rate. The supercritical $CO_2$ flow continued over a period of about 40 minutes.

After the $CO_2$ flow was discontinued, the contents of the extraction vessel were removed. Approximately 2.35 grams of griseofulvin particles were collected. A PDA detector showed that a small portion of griseofulvin remained dissolved in the dimethyl formamide as it was extracted from the extraction vessel. The concentration of griseofulvin in the extracted dimethyl formamide was determined to be about 1.5% via UV analysis.

Figure 3:
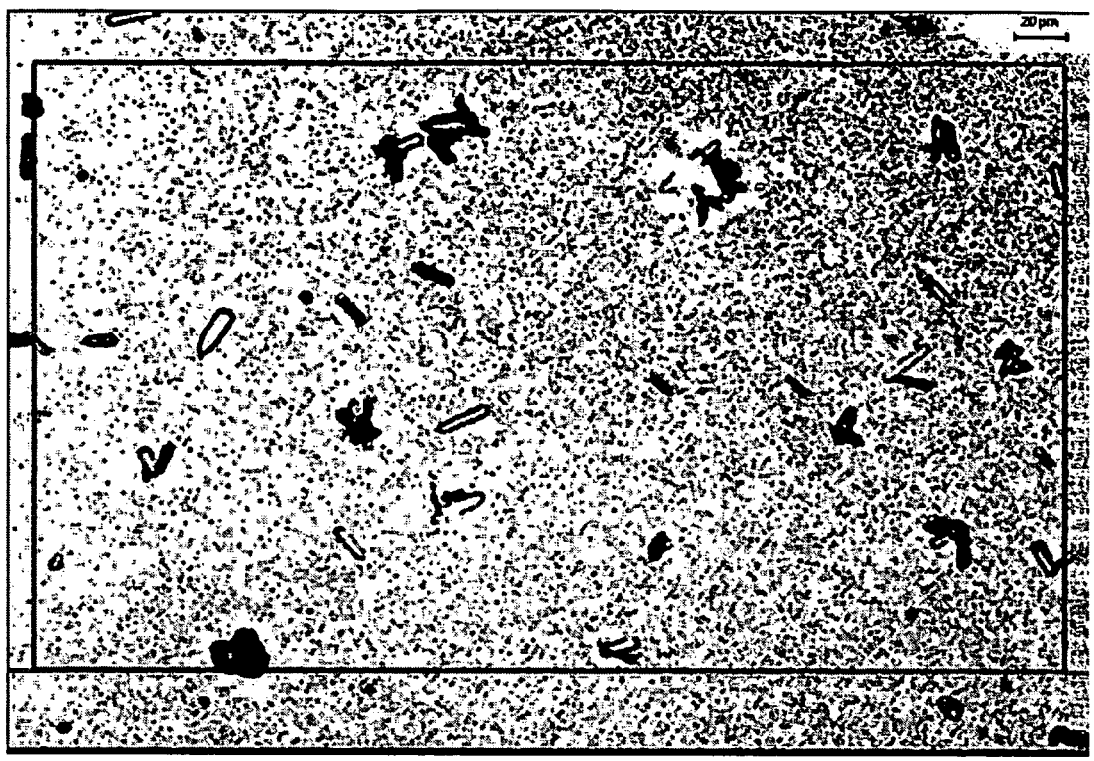
FIG. 3 is photograph of particles formed in accordance with the method of the invention.

The griseofulvin particles remained in the extraction vessel after processing in the form of crystals suspended in water. The aqueous suspension of griseofulvin was filtered, and the particles were washed with water and then examined under a light microscope. FIG. 3 is a photograph showing the aqueous suspension taken through a light microscope. The griseofulvin was in the form of elongated prisms, with the longest axis dimension being about 20 micrometers.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A method of producing a particulate suspension comprising:
   providing:
      a supercritical fluid;
      a first solvent that is soluble in the supercritical fluid;
      a second solvent that is substantially insoluble in the supercritical fluid and is at least partially soluble in or miscible with the first solvent; and
      a solute that is soluble in the first solvent and is substantially insoluble in the second solvent and the supercritical fluid;
   contacting the first solvent, the second solvent and the solute together to form a solution;
   contacting the solution with the supercritical fluid in an extraction chamber maintained at a temperature and pressure above the critical point of the supercritical fluid, the supercritical fluid extracting the first solvent from the solution and thereby causing the solute to precipitate in the form of particles that become suspended in the second solvent and thus form the particulate suspension; and
   separating the particulate suspension from the first solvent by
      flowing the first solvent out of the extraction chamber with the supercritical fluid via a backpressure regulator,
      separately flowing the particulate suspension out of the extraction chamber and into a collection vessel,
      isolating the collection vessel from the extraction chamber, and
      draining the particulate suspension from the collection vessel.

2. The method according to claim 1 wherein the solute comprises a biologically active substance.

3. The method according to claim 1 wherein the supercritical fluid is selected from the group consisting of supercritical carbon dioxide, dimethylether, straight chain or branched chain C1-C6 alkanes and combinations thereof.

4. The method according to claim 1 wherein the solution further comprises a plurality of solutes and wherein the particles suspended in the second solvent comprise the plurality of solutes.

5. The method according to claim 4 wherein the plurality of solutes comprises a first solute comprising a biologically active substance and a second solute comprising an excipient selected from the group consisting of a polymer, a wax, a lipid and combinations thereof.

6. The method according to claim 1 wherein the first solvent comprises an organic solvent.

7. The method according to claim 6 wherein the first solvent is selected from the group consisting of dimethyl formamide, dimethyl sulfoxide, alcohols, acetone, ethyl acetate and chloroform.

8. The method according to claim 1 wherein the second solvent is water.

9. The method according to claim 1 wherein the average particle size of the particles suspended in the second solvent is from about 10 nm to about 10 µm.

10. A method of producing an aqueous particulate suspension comprising:
providing:
supercritical carbon dioxide;
an organic solvent that is substantially soluble in supercritical carbon dioxide;
water; and
a biologically active substance that is soluble in the organic solvent and is substantially insoluble in water and supercritical carbon dioxide;
contacting the organic solvent, water and biologically active substance together to form a solution;
contacting the solution with the supercritical carbon dioxide in an extraction chamber maintained at a temperature and pressure above the critical point of the supercritical carbon dioxide, the supercritical carbon dioxide extracting the organic solvent from the solution and thereby causing the biologically active substance to precipitate in the form of particles that become suspended in water and thus form the aqueous particulate suspension; and
separating the aqueous particulate suspension from the organic solvent by
flowing the organic solvent out of the extraction chamber with the supercritical carbon dioxide via a backpressure regulator,
separately flowing the aqueous particulate suspension out of the extraction chamber and into a collection vessel,
isolating the collection vessel from the extraction chamber, and
draining the aqueous particulate suspension from the collection vessel.

11. The method according to claim 10 wherein the solution further comprises a second solute comprising an excipient selected from the group consisting of polymers, waxes, lipids and combinations thereof, and the particles suspended in water comprise the biologically active substance and the excipient.

12. The method according to claim 10 wherein the organic solvent is selected from the group consisting of dimethyl formamide, dimethyl sulfoxide, alcohols, acetone, ethyl acetate and chloroform.

13. The method according to claim 10 wherein the average particle size of the particles suspended in water is from about 10 nm to about 10 µm.

14. A method of producing a particulate suspension comprising:
providing:
a supercritical fluid;
a first solvent that is soluble in the supercritical fluid;
a second solvent that is substantially insoluble in the supercritical fluid and is at least partially soluble in or miscible with the first solvent; and
a solute that is soluble in the first solvent and is substantially insoluble in the second solvent and the supercritical fluid;
contacting the first solvent, the second solvent and the solute together to form a solution;
contacting the solution with the supercritical fluid in an extraction chamber maintained at a temperature and pressure above the critical point of the supercritical fluid, the supercritical fluid extracting the first solvent from the solution and thereby causing the solute to precipitate in the form of particles that become suspended in the second solvent and thus form the particulate suspension; and
separating the particulate suspension from the first solvent by
flowing the first solvent out of the extraction chamber with the supercritical fluid via a backpressure regulator, and
depressurizing the extraction chamber and collecting the particulate suspension therein.

15. The method according to claim 14 wherein the solute comprises a biologically active substance.

16. The method according to claim 14 wherein the supercritical fluid is selected from the group consisting of supercritical carbon dioxide, dimethylether, straight chain or branched chain C1-C6 alkanes and combinations thereof.

17. The method according to claim 14 wherein the solution further comprises a plurality of solutes and wherein the particles suspended in the second solvent comprise the plurality of solutes.

18. The method according to claim 17 wherein the plurality of solutes comprises a first solute comprising a biologically active substance and a second solute comprising an excipient selected from the group consisting of a polymer, a wax, a lipid and combinations thereof.

19. The method according to claim 14 wherein the first solvent comprises an organic solvent.

20. The method according to claim 19 wherein the first solvent is selected from the group consisting of dimethyl formamide, dimethyl sulfoxide, alcohols, acetone, ethyl acetate and chloroform.

21. The method according to claim 14 wherein the second solvent is water.

22. The method according to claim 14 wherein the average particle size of the particles suspended in the second solvent is from about 10 nm to about 10 µm.

23. A method of producing an aqueous particulate suspension comprising:
providing:
supercritical carbon dioxide;
an organic solvent that is substantially soluble in supercritical carbon dioxide;
water; and
a biologically active substance that is soluble in the organic solvent and is substantially insoluble in water and supercritical carbon dioxide;
contacting the organic solvent, water and biologically active substance together to form a solution;
contacting the solution with the supercritical carbon dioxide in an extraction chamber maintained at a temperature and pressure above the critical point of the supercritical carbon dioxide, the supercritical carbon dioxide extracting the organic solvent from the solution and thereby causing the biologically active substance to precipitate in the form of particles that become suspended in water and thus form the aqueous particulate suspension; and
separating the aqueous particulate suspension from the organic solvent by
flowing the organic solvent out of the extraction chamber with the supercritical carbon dioxide via a back-pressure regulator, and
depressurizing the extraction chamber and collecting the aqueous particulate suspension therein.

24. The method according to claim 23 wherein the solution further comprises a second solute comprising an excipient selected from the group consisting of polymers, waxes, lipids and combinations thereof, and the particles suspended in water comprise the biologically active substance and the excipient.

25. The method according to claim 23 wherein the organic solvent is selected from the group consisting of dimethyl formamide, dimethyl sulfoxide, alcohols, acetone, ethyl acetate and chloroform.

26. The method according to claim 23 wherein the average particle size of the particles suspended in water is from about 10 nm to about 10 μm.

* * * * *